US012776141B1

(12) United States Patent
Muthaiya Athmalingam et al.

(10) Patent No.: US 12,776,141 B1
(45) Date of Patent: Oct. 27, 2026

(54) CONTEXTUAL VIDEO STREAMING FOR VISION TRANSFORMER MODELS

(71) Applicant: Amazon Technologies, Inc., Seattle, WA (US)

(72) Inventors: Manimuthu Muthaiya Athmalingam, Austin, TX (US); Praveen Chebolu, Leander, TX (US); Paul Justin Koilraj Jayakumar, Chennai (IN); Abu Dahir Mohamed Kasim, Arlington, VA (US); Venkateshwar Junnuthulla, Leander, TX (US); Richard W. Kim, San Ramon, CA (US); Bikramjot Singh Hanzra, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 7 days.

(21) Appl. No.: 19/098,751

(22) Filed: Apr. 2, 2025

(51) Int. Cl.
*G06V 20/50* (2022.01)
*G06T 7/20* (2017.01)
*G06V 20/40* (2022.01)
*G06V 20/52* (2022.01)

(52) U.S. Cl.
CPC ................ *G06V 20/44* (2022.01); *G06T 7/20* (2013.01); *G06V 20/52* (2022.01); *G06V 2201/07* (2022.01)

(58) Field of Classification Search
CPC .... G06V 20/44; G06V 20/52; G06V 2201/07; G06V 40/168; G06V 40/174; G06V 10/768; G06V 10/40; G06V 40/172; G06T 7/20; G06T 7/70; G06T 2207/30201; G06T 2207/30232
See application file for complete search history.

(56) References Cited

U.S. PATENT DOCUMENTS

| | | | | |
|---|---|---|---|---|
| 2019/0087646 | A1* | 3/2019 | Goulden | G06F 18/22 |
| 2021/0209369 | A1* | 7/2021 | Timor | G06T 7/254 |
| 2022/0058394 | A1* | 2/2022 | Tang | G08B 13/19673 |
| 2022/0374635 | A1* | 11/2022 | Xiong | G06T 7/70 |
| 2024/0005661 | A1* | 1/2024 | Likhomanov | G06V 10/82 |
| 2025/0259445 | A1* | 8/2025 | Zundel | G06V 20/52 |

* cited by examiner

*Primary Examiner* — Alazar Tilahun
(74) *Attorney, Agent, or Firm* — Knobbe, Martens, Olson & Bear, LLP

(57) ABSTRACT

Systems and methods are provided to receive a request to perform an action in response to an event. The request is provided to the LLM to generate configuration data for the first machine learning model and the configuration data is provided to the first device. The configuration data is received by the first device and is used to configure the first machine learning model based on the configuration data. A first image is captured and an existence of the context in the first image is detected by processing the first image using the first machine learning model. A first video is provided to the second device, and the first video is applied to the second machine learning model to determine an occurrence of the event. Execution of the action is triggered based on the occurrence of the event.

20 Claims, 5 Drawing Sheets

CONTEXTUAL VIDEO STREAMING FOR VISION TRANSFORMER MODELS

BACKGROUND

Vision transformer models may apply a transformer architecture (e.g., an architecture used in natural language processing contexts) to computer vision tasks such as image classification, object detection, and segmentation. Computer vision techniques may analyze and interpret visual data such as images or videos coming from sensor devices (e.g., a camera). Sensor devices may capture motion and human activity and may detect changes in factors of a given environment such as motion and light. Such activity detection may be implemented in Internet of Things (IOT) applications using various hardware and software architecture designs.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure. In addition, various features of different disclosed embodiments can be combined to form additional embodiments, which are part of this disclosure. Further, one or more features or structures can be removed or omitted.

DETAILED DESCRIPTION OF CERTAIN EMBODIMENTS

Figure 1:
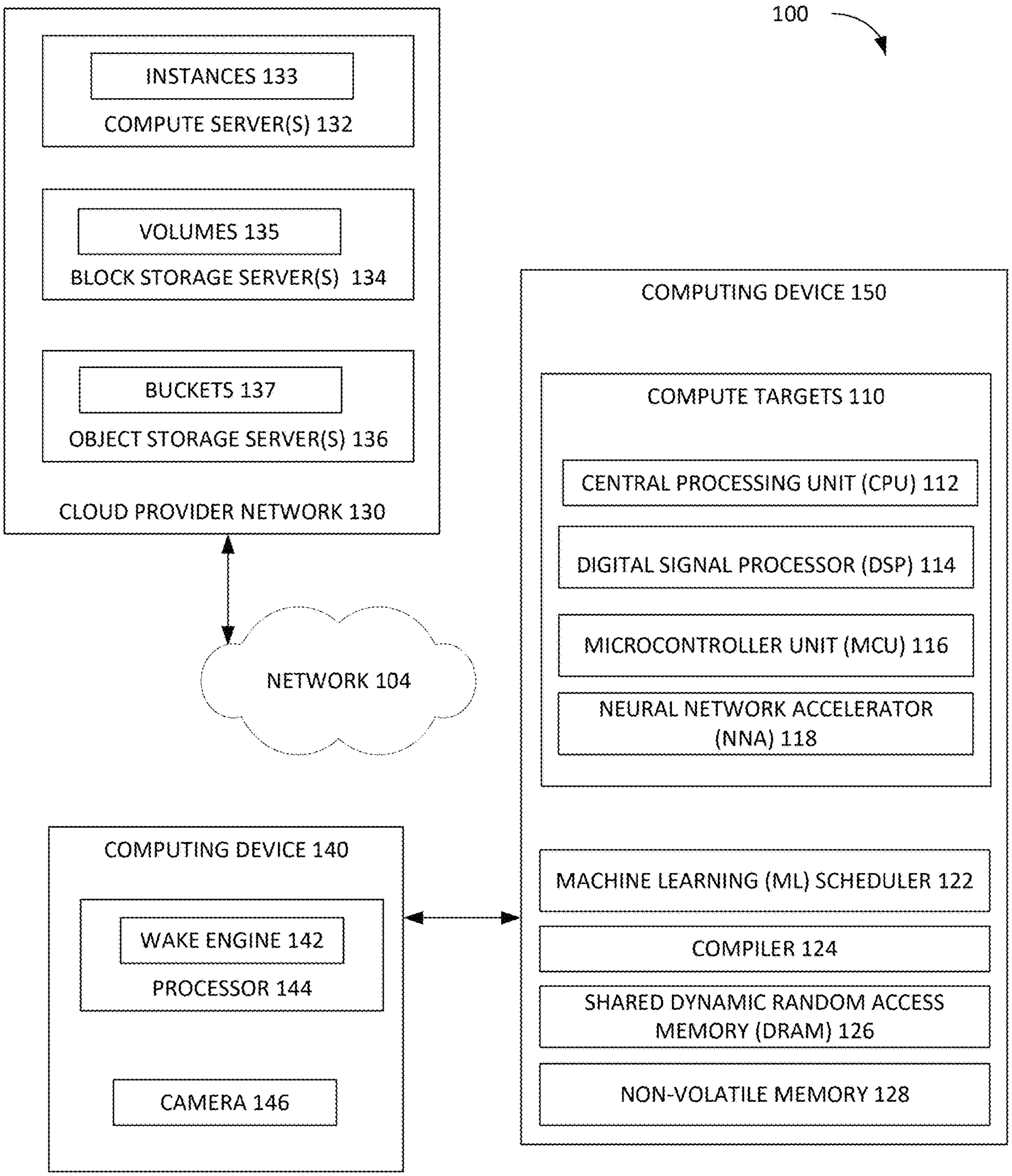
FIG. 1 illustrates an example interactive computing environment implementing a computer vision architecture in accordance with certain embodiments of the present disclosure.

The headings provided herein, if any, are for convenience only and do not necessarily affect the scope or meaning of the claimed invention.

Introduction

Generally described, aspects of the present disclosure relate to a computer vision architecture that optimizes video streaming input to vision transformer models. More specifically, aspects of the present disclosure allow resource-constrained devices to leverage the computer vision capabilities of vision transformer models without continuously streaming video to a vision transformer model. By leveraging large language models to generate context-specific action plans for computer vision models on resource-constrained devices, aspects of the present disclosure may optimize computational resource usage. Namely, aspects of the present disclosure provide a solution for selectively streaming video from resource-constrained devices to vision transformer models only at context-specific points of interest rather than continuously.

Deployment of vision transformer models may provide enhanced analysis and interpretation of visual data, but such models may be computationally intensive due, for example, to the high volume of processing tasks involved. This high volume of processing tasks may overload resource-constrained devices in a distributed computing system. Moreover, the computationally intensive nature of vision transformer models can result in costly and inefficient power consumption across devices. Thus, aspects of the present disclosure provide for a computer vision architecture that enables efficient utilization of available hardware resources in a distributed system that implements advanced computer vision techniques without continuously streaming video to a vision transformer model.

Machine learning (ML) models may be used for the vast and complex processing tasks required to make inferences about events in a local environment. For example, a series of devices connected to a network may monitor a user's home (e.g., smart speakers, doorbell cameras, etc.) to provide security and Internet-of-Things (IOT) connectivity for the user. One type of machine learning model used in such environments is a vision transformer model. A vision transformer model may make use of sensors and processors embedded in an environment (e.g., a home environment) to anticipate and respond to a user's needs without explicit input or commands, or in response to previously provided instructions. In this way, vision transformer models may be used to create an intuitive, context-aware environment that proactively assists a user and adapts to their behavior. A vision transformer model may, for example, process an ongoing video stream in the home to detect and classify events (e.g., triggers for smart home routines, intruder detection, package delivery, etc.) and subsequently respond to the events it identifies with appropriate actions (e.g., turning the lights off after a user leaves the room, sounding an alarm if an intruder breaks into the home, announcing the arrival of a package, etc.).

However, running vision transformer models continuously on local devices can be computationally intensive and inefficient, requiring large amounts of energy to power, memory, and processing resources. For this reason, vision transformer models may be too costly and resource-intensive to implement in many environments. Moreover, vision transformer models may compete with other important computational functions of the distributed system, monopolizing resources for ambient monitoring. What is more, efficient energy consumption may be a compliance requirement for certain systems, and such compliance requirements may be unworkable while implementing vision transformer models in distributed systems.

Previous solutions implementing vision transformer models have attempted to address these issues by reserving bandwidth on specific computing cores or on a cloud provider network. However, such a solution places intense, continual computational demands on the CPU and/or the cloud provider resources, resulting in high costs and high power consumption. Such a system is not only expensive but may not be low-power-compliant. Without such compliance, widespread adoption of AI technology across various industries and applications may be hindered or altogether blocked. Thus, there exists a need for an architecture that allows machine learning models, such as vision transformer models, to run efficiently in a cost-effective, low-power-compliant way amidst distributed systems.

In some embodiments, computer vision architecture may be assisted by use of a large language model (LLM) for use in things such as task generation and optimization of ML models. In the context of computer vision tasks, previous solutions may make use of an LLM hosted on a cloud network provider, which can involve large computational costs especially in the context of streaming video data. In some embodiments of the present solution, an LLM may be instantiated on a local device. In order for an LLM to run optimally on a local device, it maintains a lower input limit than an LLM instantiated on a cloud. This is because longer-than-necessary input into a local LLM may result in added latency for the LLM, and such added latency may be difficult to address in many local networks comprising limited available computing devices for the LLM. The resource usage of an LLM may be proportional to the number of tokens (e.g., basic units of text serving as the building blocks LLMs use to understand and generate text) involved in answering a prompt. A resource-intensive task for an LLM may be understood as a task requiring a relatively high number of tokens, and a task requiring a higher number of tokens often requires more computing resources compared to tasks that utilize less tokens. In some cases, the more computing resources a task requires to complete, the more time that may be required to execute the task. This additional required time can result in increased latency in responding to a request or in executing a task. In the context of an LLM, added latency means that the LLM may suffer from slower response times to received prompts. Slower LLM response times may result in a number of negative consequences, including increased operational costs and lower end user adoption rates. Because longer-than-necessary input into an LLM often constitutes the usage of hundreds of thousands of LLM tokens, passing such input into an LLM may result in added latency in the performance of the LLM.

The techniques in the various embodiments disclosed herein avoid the drawbacks of prior techniques by orchestrating model inferencing on local device cores and, in some cases, the use of remote computing systems (e.g., cloud resources). Computer vision workloads may be distributed across a user's local devices, offloading workloads to other devices and, in some cases, the cloud. In some embodiments, upon receiving a user query, an LLM may be used to retrieve relevant data and context related to the query, store the data, and use the data to generate an action plan to be executed by the computer vision architecture (e.g., an object detection model, a vision transformer model, and the like). Thus, the embodiments disclosed herein provide an efficient platform for deploying AI-powered applications and services across a wide range of devices without sacrificing low-power compliance or overly costly consumption of computing resources (e.g., by implementing intelligent and selective streaming of video to a vision transformer model).

As will be appreciated by one of skill in the art in light of the present disclosure, certain embodiments disclosed herein improve the ability of computing systems, such as distributed computing systems providing computer vision services, to implement such services in a manner such that the users of the services are not negatively impacted. Moreover, the presently disclosed embodiments address technical problems inherent within computing systems; specifically, the inherent limitations of the extensive computing resources and energy consumption required to continuously visually monitor ambient events with vision transformer models in a distributed computing environment. Moreover, by analyzing the image or video data locally, the present solution may avoid transmitting and/or storing the data over an external network or at an external device, thereby improving both security and privacy over other systems.

These technical problems are addressed by the various technical solutions described herein. Namely, certain embodiments described herein provide heterogenous model deployment for efficient utilization of hardware resources, reduces costs associated with resource usage, offloads lightweight models (e.g., object detection models), provides for local analysis of streamed visual data without storing private user data, and provides modular, scalable designs for flexibility. Thus, the present disclosure represents an improvement on large scale computing systems providing ambient detection services for distributed devices and applications, and computing systems in general.

The foregoing aspects and many of the attendant advantages of this disclosure will become more readily appreciated as the same become better understood by reference to the following description, when taken in conjunction with the accompanying drawings.

Example Computing Environment

FIG. 1 illustrates components of an example computing environment 100 for optimizing contextual video streaming from a computing device 140 to a computing device 150 hosting a vision transformer model. System 100 includes computing device 140, computing device 150, a network 104, and a cloud provider network 130. The computing device 150 further includes compute targets 110, a machine learning (ML) scheduler 122, a compiler 124, a shared DRAM 126, and a non-volatile memory 128.

In general, the computing devices 140 and 150 can be any type of computing device, such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like, or some combination thereof. The computing devices 140 and 150 may, in some examples, be configured to request performance of tasks by the ML scheduler 122, such as tasks completed by execution of machine learning models. The computing devices 140 and 150 may additionally, or alternatively, receive a result associated with completing performance of a computer vision task. Illustratively, if a task is identifying a person from video data, the resulting identification information may be provided to computing devices 140 and/or 150.

In some embodiments, computing device 140 may be a resource-constrained computing device (e.g., "low end" device, edge computing device). Computing device 140 may further comprise an image capture device 146 (e.g., a camera) or be in communication with an image capture device 146. For example, computing device 140 may be (or may be in communication with) an edge computing device such as a doorbell camera. The image capture device 146 may capture images, video, or other visual data for analysis within the computer vision architecture disclosed herein. In some cases, the computing device 140 may be resource-constrained for performance of certain LLM or AI models, such as vision models, but may not be resource-constrained for performance of other applications.

In some embodiments, a computing device 140 may host a "lightweight" or "specialized" machine learning model. For the purposes of the present discussion, a lightweight or specialized machine learning model may be a model that uses comparatively less computing resources for execution (e.g., an object detector model) than its "heavyweight" model counterpart (e.g., a vision transformer model) and/or is designed to optimize performance of particular tasks. Further, a "lightweight" machine learning model may use comparatively less computing resource because, for example, it includes less nodes, less layers, accepts a reduced number of input tokens, or is generally less complex than certain other machine learning models. Consequently, in some cases, a lightweight machine learning model may produce a less accurate output, a less accurate prediction, a less detailed output, or may consider less variables when producing an output compared to standard or heavyweight machine learning models. In some cases, the lightweight machine learning model may produce more accurate output for certain tasks, such as those for which it was specially designed, than for other tasks. In some embodiments, because computing device 140 may be a resource-constrained device, it may have limited capacity to perform vision tasks. For example, it may be able to identify an object generally (e.g., bus vs car), but may not be able to perform more detailed analysis (e.g., city bus vs school bus).

The computing device 140 may include a wake engine 142 (e.g., implemented by the processor 144) in communication with computing device 150. The wake engine 142 may comprise special logic, software, or instructions that provide the capability for it to selectively stream video from image capture device 146 to computing device 150, which may be capable of performing more detailed (e.g., heavyweight) analysis by a vision transformer model compared to the computing device 140.

By dividing vision model tasks between the computing device 140 and the computing device 150, the resource-constrained device 140 is able to process images more frequently (e.g., continuously) while the computing device 150 processes images less frequently (e.g., in response to a trigger by the computing device 140), which can result in conserving power and reducing the use of computing resources. The lightweight model of the resource-constrained device 140 may provide inferences (e.g., detection of a specified object) to the wake engine 142, and in turn, the wake engine 142 may trigger (e.g., "wake") computing device 150 when a more detailed analysis of captured visual data is desired or appropriate based on the analysis of the lightweight model.

In some embodiments, computing device 150 may host heavyweight machine learning models such as a vision transformer model. Computing device 150 may include compute targets 110, ML scheduler 122, compiler 124, and shared DRAM 126. Compute targets 110 may be heterogeneous processing devices. The compute targets 110 may be CPUs 112, DSPs 114, microcontroller units (MCUs) 116, neural network accelerators 118, GPUs, ARMs, or any other type of processing device that may be used to perform an artificial intelligence (AI)-related task. Compute targets 110 may be used by ML scheduler 122 to execute tasks, such as tasks performed using vision transformer models. Non-limiting examples of computer vision tasks may include analyzing video data, detailed object recognition, object tracking, or scene understanding of streamed video data determining device state, identifying people from sensor data or cameras, responding to queries, and the like, or some combination thereof. In some embodiments, compute targets 110 may be implemented on a system-on-a-chip ("SOC"). For example, a CPU 112, MCU 116, DSP 114, and NNA 118 may be implemented on different portions of an SOC and selectively switched on or to a low-power state. In another embodiment, the compute targets 110 may be implemented on separate packages connected to one another (e.g., via a printed circuit ("PC") board, network 104). In some embodiments, computing device 150 may be implemented on a "hub" either in a local distributed system or on a cloud provider network 130. Further, computing device 150 may host a non-computer-vision large language model (LLM), as will be discussed in further detail below.

The CPU 112 may be a general-purpose processor or a special purpose processor. In some cases, the CPU 112 is capable of executing an ML model, such as a neural network. However, the CPU 112 may be less efficient in executing the ML model compared to other types of processing devices that are designed to execute large-scale machine learning models. In some embodiments, a CPU 112 may host AI framework, for example, an AI service. An AI service may run machine learning model pipelines, such as pipelines for context generation (e.g., wake engine 142), computer vision, and vision transformer models. The AI service may be in communication with an AI client (e.g., hosted on processor 144). Processor 144 may illustratively be any type of processing device that may be used to perform an AI-related task.

Returning to computing device 150, the DSP 114 may be a be microprocessor capable of performing high-speed calculations, such as for signal processing. In some cases, the DSP 114 may, in some examples, perform such computations during execution of ML models. In some cases, a DSP 114 may more efficiently process an ML task resulting in faster execution of the ML task compared to a CPU. In some embodiments, the DSP 114 hosts an AI client for lightweight machine learning models such as an ambient activity event detector model. By offloading a lightweight machine learning model to the DSP 114, an AI client may allow the CPU 112 to remain in a low power state while the DSP 114 more efficiently makes use of computing resources available in order to run a lightweight machine learning model with an AI client (e.g., on the neural network accelerator 118).

A neural network accelerator (NNA) 118 may include special purpose processors that are specifically designed to efficiently execute ML and AI tasks. An NNA 118 is used as an example herein, but other types of accelerators may be substituted for an NNA 118 in some embodiments including, but not limited to, AI accelerators, ML accelerators, and the like, or some combination thereof. Often, an NNA 118 can more efficiently execute an ML task compared to a CPU 112 or DSP 114 resulting in faster execution of the ML task compared to the CPU 112 or DSP 114. The NNA 118 may, in some examples, utilize a combination of processing devices to improve efficiency with respect to performing at task. NNA 118 may, in some examples, include other processing devices, such as GPUs, Field Programmable Gate Arrays (FPGAs), application specific integrated circuits (ASICs), or the like.

Accelerators, such NNA 118, may accordingly be higher efficiency in performing these tasks with respect to other processing devices, such as other processing devices included in compute targets 110. Efficiency, as used herein, may refer the execution time to complete a task a task using an ML model, a quantity of compute resources used to execute a task using the ML model, power utilization to execute the task, and the like, or some combination thereof. Processing devices and associated instruction set architectures (ISAs) are well known to those skilled in the art and, thus, are not described in more detail herein.

A compiler 124 may compile ML models based on the ISAs of compute targets 110. A compiler 124 may, in some examples, divide ML models into model portions based on operations performed during execution of the ML model. It will be appreciated that ML models executed to perform tasks, or portions thereof, may be implemented using ML model structures and algorithms, including, but not limited to: Convolutional Neural Networks (CNNs), Long Short Term Memory Networks (LSTMs), Recurrent Neural Networks (RNNs), Generative Adversarial Networks (GANs), Radial Basis Function Networks (RBFNs), Multilayer Perceptrons (MLPs), Self-Organizing Maps (SOMs), Deep Belief Networks (DBNs), Restricted Boltzmann Machines (RBMs), Autoencoders, other models, or an ensemble thereof.

When computing device 150 is booted, the compiled model portions may be loaded from non-volatile memory 128 to a shared memory (e.g., shared between compute targets 110 on computing device 150). The compiled model portions may, for example, be loaded into shared DRAM 126. Shared DRAM 126 may, for example, be a shared dynamic random-access memory (DRAM) of computing device 150. Storage in the shared DRAM 126 may facilitate zero-copies. Zero-copies may describe operations which mitigate or reduce a need to copy data from one memory space or another. Reduction in copies between memory spaces for different compute targets 110 when transferring execution of a task, for example, may advantageously reduce use of processing capacity and memory during the transfer. This may advantageously allow the memory and processing capacity to be used in completion of the tasks. Accordingly, use of the shared DRAM may advantageously facilitate use of the compiled model portions by compute targets 110.

Some compute targets 110 may, additionally, or alternatively, be included in external computing devices (e.g., computing devices 140 and/or 150). For example, computing device 150 may represent a hub for in Internet of Things (IOT) system. IOT devices in the system may include compute targets 110. As previously mentioned, computing devices 140 and 150 may, for example, represent IOT devices in the system.

Computing environment 100 may include a cloud provider network 130 in which embodiments of the present disclosure can be implemented. The cloud provider network 130 can be accessed by computing devices 140 and 150 over a network 104. A cloud provider network (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 130 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network 130, which may be provisioned in user accounts.

In FIG. 1, the cloud provider network 130 includes one or more block storage servers 134, one or more object storage servers 136, and one or more compute servers 132 that are in networked communication with one another and with the network 104 to provide users with on-demand access to computing resources including volumes 135, buckets 137, and instances 133, among others. These particular resources are described in further detail below. Some implementations of cloud provider network 130 can additionally include domain name services ("DNS") servers, relational database servers, and other server configurations (not illustrated) for supporting on-demand cloud computing. Each server includes hardware computer memory and/or processors, an operating system that provides executable program instructions for the general administration and operation of that server, and a computer-readable medium storing instructions that, when executed by a processor of the server, allow the server to perform its intended functions.

The cloud provider network 130 can provide on-demand, scalable computing services to users through the network 104, for example allowing users to have at their disposal scalable "virtual computing devices" via their use of the block storage servers 134, object storage servers 136, and compute servers 132. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 130 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network 130. Preferably, availability zones within a region are positioned far enough away from one other that the same natural disaster should not take more than one availability zone offline at the same time. Customers can connect to availability zones of the cloud provider network 130 via a publicly accessible network (e.g., the Internet, a cellular communication network) by way of a transit center (TC). TCs are the primary backbone locations linking customers to the cloud provider network 130, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network 130 may deliver content from points of presence outside of, but networked with, these regions by way of edge locations and regional edge cache servers. This compartmentalization and geographic distribution of computing hardware enables the cloud provider network 130 to provide low-latency resource access to customers on a global scale with a high degree of fault tolerance and stability.

Turning specifically to the roles of the different servers within the cloud provider network 130, the compute servers 132 include one or more servers on which provide resizable computing capacity to users for building and hosting their software systems. The compute servers 132 and associated control plane functionality can provide an elastic compute cloud service of the cloud provider network 130. Compute services can be referred to as a virtual compute service, or cloud compute service, in various implementations. Users can use the compute servers 132 to launch as many virtual computing environments, referred to as virtual compute instances, virtual machine instances, virtual machines, or "instances" 133, as they need. Instances 133 can have various configurations of processing power, memory, storage, and networking capacity depending upon user needs. The compute servers 132 can also include computer storage for temporary data used while an instance is running, however as soon as the instance is shut down, this data is lost.

The block storage servers 134 provide persistent data storage for the compute servers 132 in the form of block storage volumes 135, each of which represents a virtualized, network-accessible block-storage device (e.g., a virtual "hard disk"). In the present disclosure, the use of the term "disk" is intended to convey the functionality historically associated with physical disks (e.g., persistent mass data storage); notably, the use of the term does not imply the presence of a physical "disk." For example, a solid-state storage device lacking a physical "disk" may nevertheless be referred to as a "disk" within the context of this disclosure. Block storage may be referred to in various implementations as cloud disks service, a managed disk service, a storage area network service, a persistent disk service, or a block volumes service, while block storage volumes may variously be referred to as cloud disks, storage disks, cloud volumes, disks, block volumes, or simply "volumes." The block storage servers 134 and associated control plane functionality can provide an elastic block store service of the cloud provider network 130. Data of volumes 135 may be encrypted or unencrypted.

The block storage servers 134 include one or more servers on which data is stored as blocks. A block is a sequence of bytes or bits having a fixed length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 kB, 128 KB, 256 kB, 512 KB, or larger, depending upon the implementation.

Volumes 135, which can be treated as an individual hard drive ranging for example from 1 GB to 1 terabyte TB (or more) in size, are made of one or more blocks stored on the block storage servers 134. Although treated as an individual hard drive, it will be appreciated that a volume may be stored as one or more virtualized devices implemented on one or more underlying physical host devices. Volumes 135 may be partitioned a small number of times (e.g., up to 16) with each partition hosted by a device of the cloud provider network 130 that has the ability to transfer data at around 1 GB per second ("Gbps") in some implementations. These volumes provided persistent, dedicated storage that can be attached to particular instances of the compute servers 132. Each volume may be "attached" to an instance 133 running on a compute server 132, and can be detached from that instance 133 and re-attached to another. Attachment between a volume and an instance refers to the establishment of a connection between a client of the instance and the volume. This connection may be referred to as a "lease" in some implementations, and it enables to instance to view the volume as if it were a local storage drive, even though the volume and instance may be hosted on different physical machines and communicating over a network. Attachment may be facilitated, for example, by specialized hardware or software executing on compute servers 132 (which specialized hardware or software is sometimes referred to as a block storage server "client") that operates to obtain mass storage operations (e.g., according to the Serial AT Attachment (SATA) protocol or other known storage protocols) and pass corresponding operations to the block storage servers 134 for implementation, such that it appears from the point of view of an instance 133 that volumes 135 represent local disk drives. The client may be implemented on an offload card of a server that includes the processing units (e.g., CPUs or GPUs) of the compute instance. For example, in some implementations, at least a subset of virtualization management tasks may be performed at one or more offload cards so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management, input/output virtualization to network-attached storage volumes, local migration management tasks, instance health monitoring, and the like. The block storage servers 134 may have built-in redundancy for volumes by replicating the volume across multiple servers within an availability zone, which means that volumes will not fail if an individual drive fails or some other single failure occurs.

The object storage servers 136 represent another type of storage within the cloud provider network 130. The object storage servers 136 and associated control plane functionality can provide an object-based storage service of the cloud provider network 130. Object-based storage services can be referred to as a blob storage service, cloud object storage service, or cloud storage service, in various implementations. In contrast to block-based storage (e.g., where devices read and write fixed-length blocks identified by a location, such as a logical block address (LBA)), object storage services 136 facilitate storage of variable-length objects associated with a corresponding object identifier. Each object may represent, for example, a file submitted to the servers 136 by a user for storage (though the servers 136 may or may not store an object as a file). In contrast to block-based storage, where input/output (I/O) operations typically occur via a mass storage protocol like SATA (though potentially encapsulated over a network), interactions with the object storage servers 136 may occur via a more general network protocol. For example, the servers 136 may facilitate interaction via a Representational State Transfer (REST) application programming interface (API) implemented over the Hypertext Transport Protocol (HTTP). The object storage servers 136 may store objects within resources referred to as buckets 137. Each object typically includes the data being stored, a variable amount of metadata that enables various capabilities for the object storage servers 136 with respect to analyzing a stored object, and a globally unique identifier or key that can be used to retrieve the object. Objects stored on the object storage servers 136 are associated with a unique identifier, such that authorized access to them can be obtained through requests from networked computing devices in any location. Each bucket 137 is associated with a given user account. Users can store as many objects as desired within their buckets, can write, read, and delete objects in their buckets, and can control access to their buckets and the objects contained therein. Further, in embodiments having a number of different object storage servers 136 distributed across different ones of the regions described above, users can choose the region (or regions) where a bucket is stored, for example to optimize for latency. Users can use object storage servers 136 for purposes such as storing photos on social media websites, songs on music streaming websites, or files in online collaboration services, to name a few examples. Applications developed in the cloud often take advantage of the vast scalability and metadata characteristics of the object storage servers 136. The object storage servers 136 can support highly parallel data accesses and transfers. The object storage servers 136 can offer even greater redundancy than the block storage servers 134, as the object storage servers 136 can automatically replicate data into multiple availability zones. The object storage servers 136 also have different data throughput than the block storage servers 134, for example around 20 Mbps for a single stream of data.

While the object storage servers 136 can be used independently from the instances 133 and volumes 135 described above, they can also be used to provide data backup with respect to object-based snapshots (e.g., object-stored backups of volume data). For example, data of a volume 135 may be represented as one or more objects stored within the object storage servers 136 (with each object representing one or more blocks of the volume 135) along with one or more manifests identifying the objects. Together, the objects and manifests can logically represent a point-in-time representation of the volume 135 referred to as an object-based snapshot.

As illustrated in FIG. 1, computing devices 140 and 150 may communicate with each other via a local network in some embodiments. In other embodiments, computing device 140 and 150 communicate over network 104, which can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein.

Example Computer Vision Architecture Implementation

Figure 2:
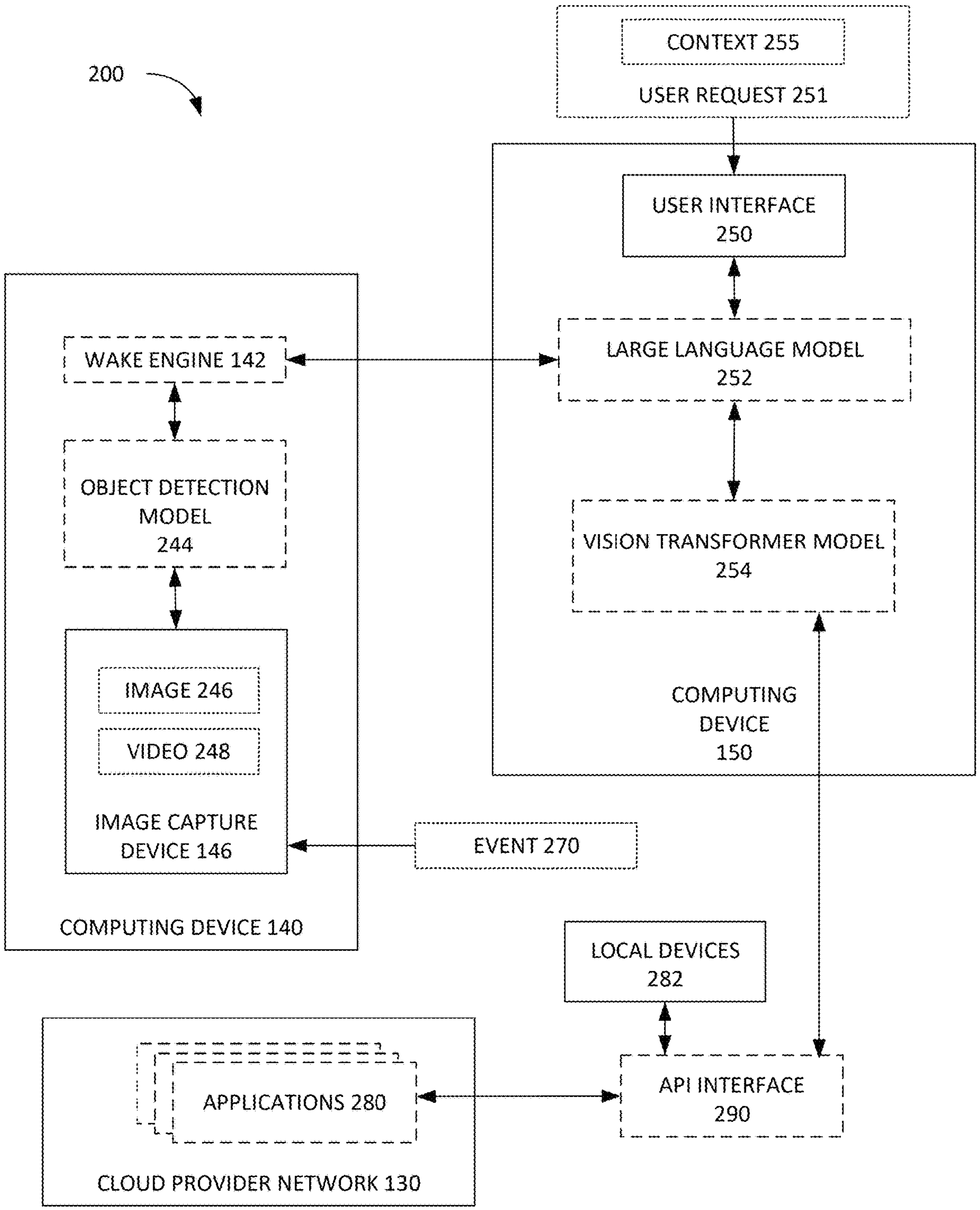
FIG. 2 illustrates a block diagram of exemplary components of a computer vision architecture in accordance with certain embodiments of the present disclosure.

Turning to FIG. 2, an example computing environment 200 is depicted in which the computer vision architecture disclosed herein is implemented on illustrative computing device 140 and computing device 150 in communication with a cloud provider network 130. In this example embodiment, the computing device 140 (e.g., a resource-constrained device) hosts a wake engine 142 and an object detection model 244, while the computing device 150 (e.g., with more computing capacity than resource-constrained computing device 140) hosts an LLM 252 running a vision transformer model 254.

In some embodiments, the computing device 150 may host an LLM 252 (e.g., an LLM not for computer vision tasks). An LLM 252 may be understood as a type of machine learning model that uses AI to generate human-like text in response to various types of input (e.g., GPT-4, BERT, ROBERTa). An LLM 252 may assist in identifying objects of interest based on a user request 251 or a request generated by an application. An LLM 252 may be a generative AI model trained on large amounts of text data in order to generate new content based on the training data. For example, an LLM 252 may be fine-tuned on a dataset related to a target domain (e.g., surveillance, automotive, industrial) to enhance its understanding of the relevant objects and their descriptions.

An LLM 252 may be instantiated and executed on a computer or any number of computing devices. In some examples, an LLM 252 may use an LLM agent in order to interact with an endpoint (e.g., a network endpoint). An LLM agent may be understood as an LLM instance with additional interfacing code (e.g., an HTTP interface) that allows the output of the LLM instance in a given format (e.g., HTTP GET/POST) to result in a corresponding network call. Such an LLM agent may then receive the response to the network call and input this response back into the LLM instance. For example, an LLM 252 may receive a prompt (e.g., user request 251, from a human end user or computing system) that requires a related LLM agent to make a request to an API. In response, the API returns an API response to the LLM agent, and the LLM agent provides the API response as input to the LLM 252 for use in generating output for the received prompt.

Illustratively, the LLM 252 may be any trained machine learning model (e.g., a sequence-to-sequence model, also referred to as "Seq2Seq" model) that utilizes deep learning algorithms to process and understand natural language queries or prompts and generates outputs (e.g., texts, images, audio, video, etc.). The LLM 252 may be trained on a large corpus of data. Moreover, the LLM 252 may be a transformer-based network or other self-attention based network (e.g., an encoder-decoder transformer architecture or decoder-only transformer architecture). Additionally, the LLM 252 may process or compute an assortment of language tasks, such as translating languages, analyzing properties of an API response, chatbot conversations, and more. The LLM 252 may process or compute conversational textual data, identify one or more entities and relationships between them, and generate new text that is coherent and grammatically accurate.

As described herein, the LLM 252 may receive a user request 251 at a user interface 250 (e.g., a graphical user interface, an audio interface) of the computing device 150.

The LLM 252 may then process a transcription based on a user request 251 and generate an output. In some embodiments, such output may take the form of a computationally optimized action plan using the computer architecture of computing device 140 and computing device 150 to identify an "event" 270 involving context 255 described in the user request 251. In some embodiments, context 255 may include a person or object, the state of an object, an environment or state of an environment. In some embodiments, context 255 may include a location and/or a time of day associated with a particular user request 251. For example, for a user request 251 in which a user is requesting a system action in response to the delivery of a package on the front porch, the context 255 of a package delivery on a front porch may not only include an object (package) and a person (mail courier), but also an (implied or explicit) time and location: e.g., the location may be the front porch (but not the back porch), and the time may be standard delivery daytime hours (but not the night). In this way, in this particular example, the context 255 of a package delivery on the front porch may assist in the system's ability to filter out inapplicable images and/or data. A person approaching the back porch may, in the current example, not fit within the context 255 of detecting a package delivery. However, in other cases, the context 255 may differ. For instance, if a user leaves instructions for a delivery person to leave items at the back door, the context 255 may include a location of the back door. Similarly, as it is unlikely to receive packages between particular hours (e.g., 8:00 PM-8:00 AM), the system may recognize via the context 255 that a person approaching the front porch between the particular hours may not be the delivery person. In another example, a user may order food delivery. In this example, the context 255 may include a person (e.g., a food delivery courier) and an object (e.g., a food container). Using the context 255 information, the system may determine that a person approaching a door outside of the particular package delivery hours is unlikely to be an intruder based on the context information of a food order and a food container being held by the person. In some such cases, the user may make the food delivery order through the system, thereby providing the system with context 255 information of the food order via data associated with the food delivery order. Thus, in some examples, a user may make use of the computing architecture of the computing device 140 (e.g., a doorbell camera) to scan for a number of different events including package delivery, food delivery, and unwanted persons, such as potential intruders. Through context 255—which may be gained explicitly from the user (e.g., through user input, user utterance, or the user request 251) or implicitly from data available to the computer architecture or inferences made by the LLM 252 related to the data available to the computer architecture—the computing device 140 may analyze the input it receives and determine actions that are triggered based in part on particular context information and/or triggers.

The user request 251 may also include additional input to inform the action plan, such as audio recordings, visual information, historical information, profile information, geographic identifiers, and the like. Additionally, the user request 251 can also include information that can identify the type or formatting of the generated output.

For sake of discussion, an event 270 may be any occurrence captured in the visual data, such as a motion in the home. As will be discussed in further detail below, when the model (e.g., object detection model 244) run by a wake engine 142 on the computing device 140 detects an event 270 involving the context 255 of the user request 251, it notifies the wake engine 142, which in turn "wakes" the LLM 252 and vision transformer model 254 for further processing. Upon completing computer vision tasks with the vision transformer model 254, the computing device 150 may provide notifications (e.g., to the wake engine 142 and/or to applications 280 through the API interface 290 of the cloud provider network 130) or trigger downstream actions by applications 280 subscribed to computer vision intelligence via the API interface 290.

As noted above, upon visually identifying the event 270, the computer vision architecture may trigger downstream "actions" to be taken by the system or related applications (e.g., applications 280 of the cloud provider network 130). For example, a user request 251 may ask an LLM 252 to announce the delivery of a package on the front porch over a speaker in the home any time the doorbell camera and related computer vision architecture identifies a mail courier on the front porch. In this case, the context 255 to be identified may include the mail courier and/or the package, and the event 270 may be the mail courier arriving with a package on the front porch. When the courier arrives on the porch in this example, the computer vision architecture may trigger the speaker system of the home to announce that a package has arrived on the porch.

In some embodiments, the computing device 150 hosts a vision transformer (ViT) model 254 for use in computer vision tasks. A vision transformer model 254 may be a computationally intensive model (e.g., ViT-Base, ViT-Large, or a custom ViT architecture). In some embodiments, the vision transformer model 254 may be deployed on a "hub" (as described elsewhere in this disclosure) along with the LLM 252. The vision transformer model 254 may be responsible for performing advanced computer vision tasks, such as detailed object recognition, tracking, or scene understanding on streamed video from the image capture device 146.

In some embodiments, sensor data may be gathered by any number of image capture devices 146 to capture image 246 or video 248. In some examples, image capture devices 146 may include sensors for event detection (e.g., detecting "events" 270 in ambient background data captured by sensors so that the environment comprising the sensors may intelligently respond to user behavior even without explicit prompting from the user). In some embodiments, image capture devices 146 may include devices such an image detector, a camera, a virtual reality sensor, or a cellular device. Other types of sensors involved in various embodiments of computer vision architecture disclosed herein may include examples such as multi-modal devices, ambient light sensors, microphones, accelerometers, and ultrasound detectors. In this way, computer vision architecture allows for flexible integration of new sensor types as applicable (visual or otherwise). Image capture devices 146 may be integrated with the computing device 140, interfacing with the processor 144 of the computing device 140 at the chip site level and providing the visual data (e.g., video stream, video feed, video data, video, images) directly to the object detection model 244 and/or the wake engine 142 hosted on the computing device 140. Alternatively, the image capture device 146 may be a separate device in communication with the computing device 140.

In some embodiments, a computing device 140 may be a resource-constrained local device with less computational resources than computing device 150. In some embodiments, a computing device 140 may include any of: a image capture device 146, an object detection model 244, and a wake engine 142. A wake engine 142 may implement a computer vision model. A wake engine 142 may orchestrate and/or initiate a lightweight model. In some embodiments, a wake engine 142 may initialize and configure an object detection model 244. For example, a wake engine 142 may run an object detection model 244 that detects whether an event occurred amidst a chunk of visual data. In some embodiments, an object detection model 244 may return a binary decision regarding whether context 255 exists in a segment of visual data (e.g., an image, video) captured by the image capture device 146 (e.g., "yes" the context 255 is within the visual data, or "no" the context 255 is not within the visual data). In some embodiments, an object detection model 244 may be a lightweight convolutional neural network (CNN), a model based on a MobileNet architecture, or a model based on an EfficientDet architecture. The object detection model 244 is one nonlimiting example of a computer vision model that may be used herein. It should be understood that other computer vision models may be used within the context of the present disclosure.

In some embodiments, by offloading "lightweight" models (e.g., models such as the object detection model 244 that use comparatively less computing resources and energy for execution) to a coprocessor (e.g., processor 144), the computing device 150 or its subcomponents may remain in low power mode (or otherwise use less computing resources) until more complex processing tasks (e.g., "heavyweight" models requiring large amounts of computing resources and energy to execute, as discussed in further detail below) are requested. In this way, the computing device 150 is "awake" while it is requested to process a computer vision task and placed in a low-power state when lightweight tasks that can be managed by the processor 144, or other coprocessors, are being performed.

Figure 3A:
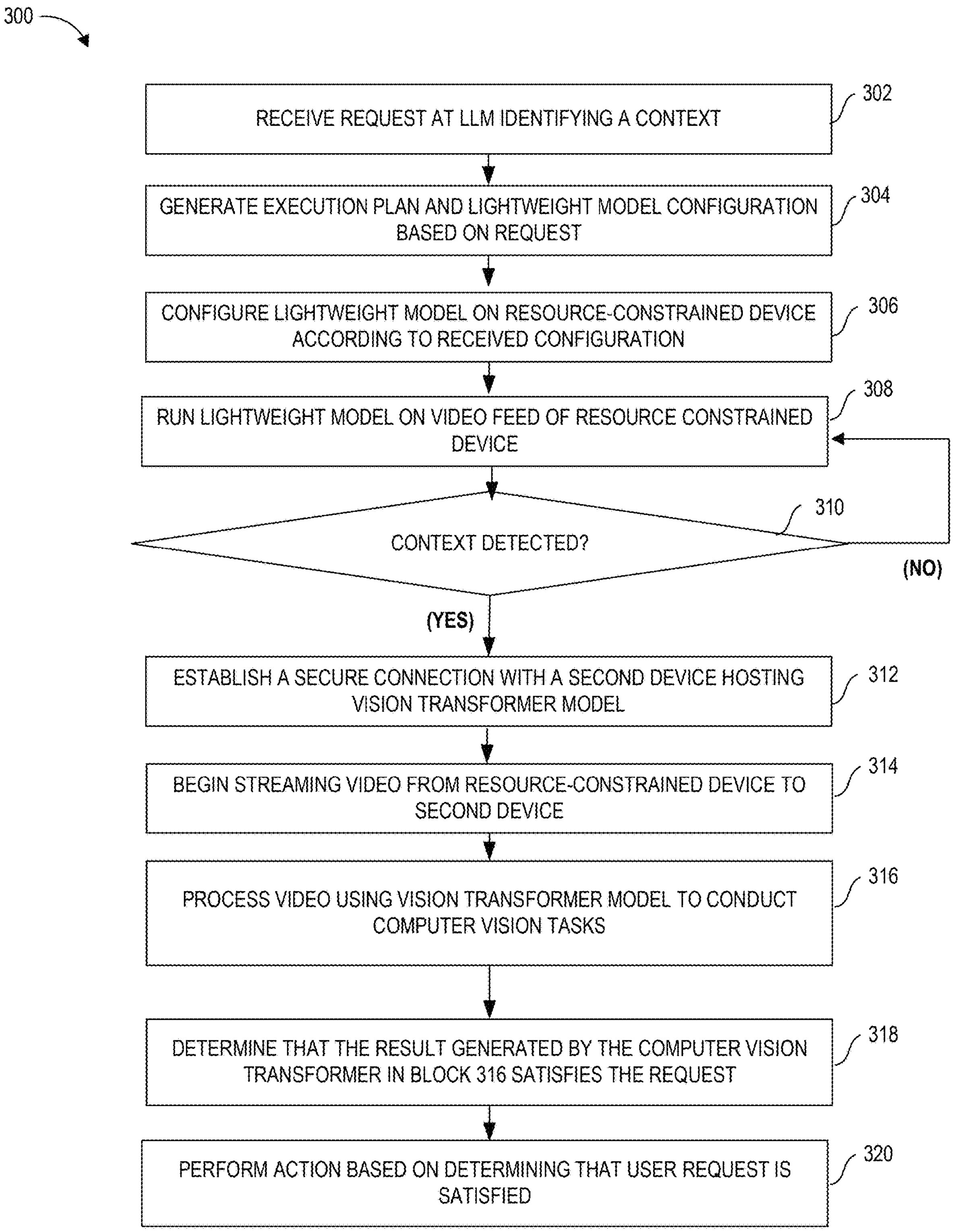
FIG. 3A depicts an illustrative routine of a computer vision architecture in accordance with certain embodiments of the present disclosure.

Example Method and Interactions of Offloading Object Detection Model to Resource-Constrained Device FIG. 3A illustrates an example computer-implemented method 300 for offloading an object detection model 244 to a resource-constrained device (e.g., computing device 140) of a computer vision architecture in accordance with some aspects of the present disclosure. FIG. 3A will be described with respect to FIGS. 1 and 2 at least because the blocks of method 300 may, in some examples, offload object detection model 244 to a resource-constrained device with illustrative computer vision architecture components of FIGS. 1-2.

Figure 3B:
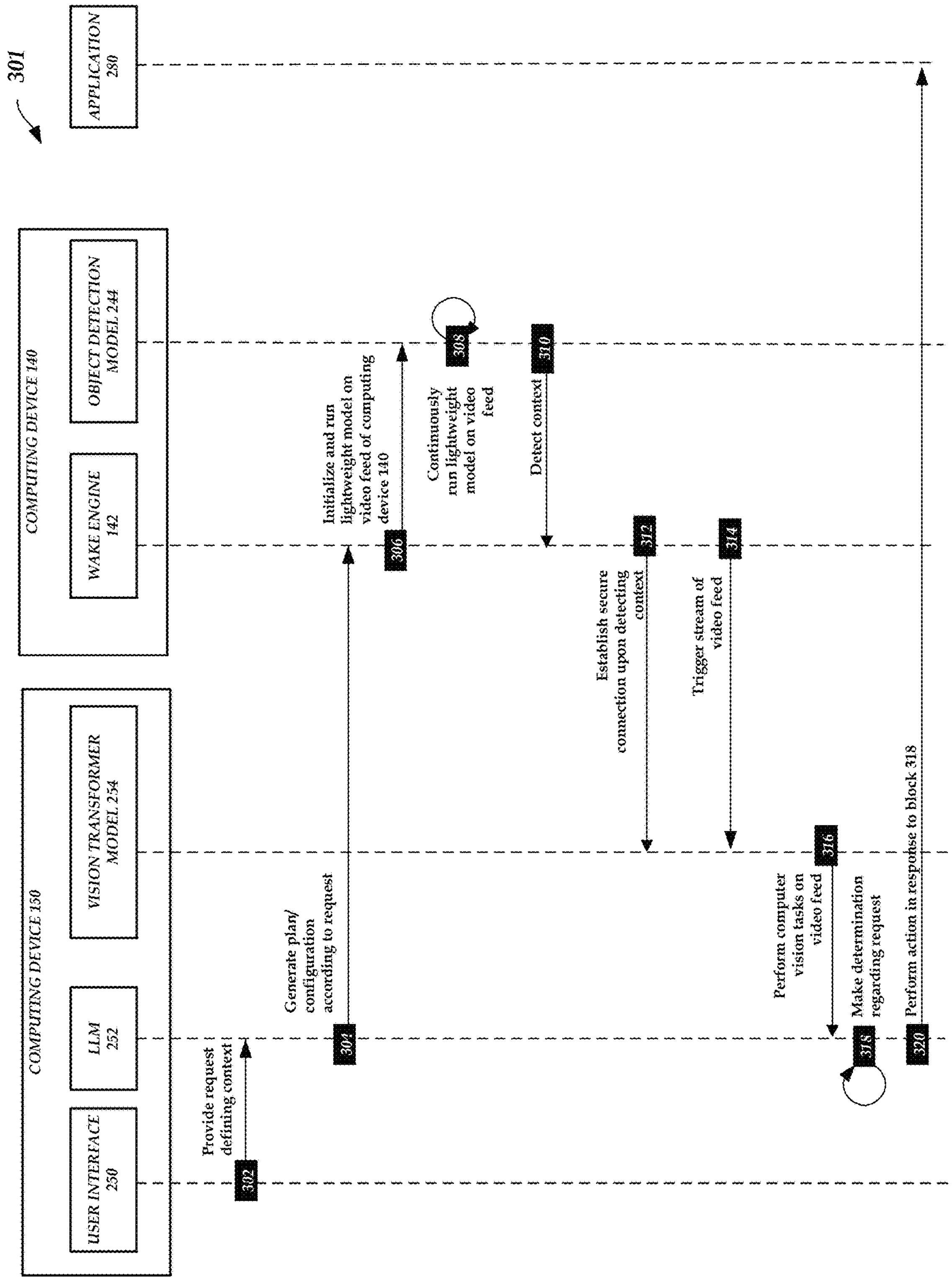
FIG. 3B depicts illustrative interactions between components of an exemplary computer vision architecture in accordance with certain embodiments of the present disclosure.

Moreover, FIG. 3A will be discussed in parallel with FIG. 3B. Namely, the numbered routine blocks of FIG. 3A (e.g., block 302, block 304) share the same numbering and represent the same actions as the component interactions in FIG. 3B (e.g., block 302, block 304). FIG. 3B illustrates component interactions in an example system 301 implementing a computer vision architecture in accordance with some aspects of the present disclosure. FIG. 3B will also be described with respect to FIGS. 1 and 2 at least because the blocks of system 301 may, in some examples, offload object detection model 244 to a resource-constrained device with illustrative computer vision architecture components of FIGS. 1-2.

Some of the processes, steps, and/or modules discussed herein with respect to FIG. 3A and FIG. 3B may be combined, separated into sub-parts, omitted entirely, and/or rearranged to run in a different order and/or in parallel. In addition, in some embodiments, different blocks may execute on various components of the computing device 140 and/or 150 of FIG. 1.

At block 302 of FIGS. 3A and 3B, computing device 150 may receive a user request 251 at LLM 252 identifying context 255 (e.g., an object of interest such as a package on a front porch, a bus, a person, an animal, etc.). In some embodiments, the user request is received at user interface 250 of computing device 250 (e.g., as an utterance, through text input, or via interaction with a user interface). For example, the user request may specify context 255 using natural language descriptions or examples. The LLM 252 may gather context for the request or the query.

At block 304 of FIGS. 3A and 3B, the LLM 252 generates an action plan and/or a machine learning model configuration based on the user request 251 and subsequently provides this action plan and configuration to the wake engine 142. In some embodiments, the action plan and machine learning model configuration generated by LLM 252 dynamically identify available machine learning models available in the computer vision architecture to accomplish the user request 251 (e.g., object detection model 244 and vision transformer model 254). The LLM 252 may make use of the context generated by the context generation agent when generating an action plan—for example, a context generation agent may leverage other sensor devices in the computer vision architecture to further understand the environment surrounding the user request 251 (e.g., the time of day, the temperature, device state). This context 255 may be used by the LLM 252 to optimize a step-by-step plan for the computer vision architecture to accomplish the user request. This action plan, along with the configuration for the object detection model 244 in order to execute the action plan, is provided by the LLM 252 to the wake engine 142.

At block 306 of FIG. 3A and FIG. 3B, the wake engine 142 configures the object detection model 244 on a resource constrained device (e.g., computing device 140) according to the action plan and configuration it receives at block 304. For example, if the system is instructed via a user request 251 to announce the arrival of a package on the front porch, the wake engine 142 (instructed by the LLM 252's action plan) may configure the object detection model 244 of a resource-constrained doorbell camera to detect when a person or human figure arrives on the front porch in its field of vision and/or when a box-like object is detected in an image.

At block 308 of FIGS. 3A and 3B, the wake engine 142 runs the object detection model 244 on the image/video feed (e.g., video 248, image 246) of the image capture device 146 of computing device 140 (e.g., a resource-constrained device). Because the object detection model 244 may be a lightweight machine learning model, a less powerful system may be enabled to execute the object detection model 244. In this way, the computing device 140 also conserves bandwidth because it sends the video to computing device 150 less frequently, thus saving power and energy by less frequent use of the vision transformer model of computing device 150. Continuing the package example, the object detection model 244 may continuously or intermittently scan for a human figure or box-like object on the front porch. As the object detection model 244 is a lightweight model, it may be able to identify the existence of a human or box-like object but may not be capable of determining whether the human is a mail courier or whether the box-like object is a package. Thus, further analysis downstream by a vision transformer model 254 may be used to confirm what is depicted in the image in response to a trigger associated with the initial detection of the human or box-like object.

At decision block 310 in FIG. 3A and FIG. 3B, the object detection model 244 determines whether context 255 is detected within the video 248 captured by the image capture device 146. When the object detection model 244 does not detect context 255, the method returns to block 308 to continue running the object detection model 244 on the video 248 captured by the image capture device 146. However, when the object detection model 244 identifies the requested context 255 in the video 248 (or image 246), the object detection model 244 returns a notification to the wake engine 142 of the result, and the method proceeds to block 312. For example, the object detection model 244 may identify a human figure (e.g., requested "object" 255) within its video 248 captured by the doorbell camera on the front porch.

At block 312 of FIGS. 3A and 3B, the wake engine 142 establishes a secure connection with a second device (e.g., computing device 150) hosting a vision transformer model 254. In some examples, this secure connection may be an encrypted tunnel or a virtual private network (VPN). The secure connection may serve as a privacy protection for users of the computer vision architecture, by setting up an avenue for encryption of the video stream that will be triggered in the following block 314. This privacy protection decreases the likelihood that whatever is temporarily captured in a video 248 stream will be intercepted and viewed by an unintended party (maliciously or otherwise). For example, a user may not desire all the events 270 occurring on their front porch to be streamed without encryption to a vision transformer model. Thus, block 412 secures the data to be transmitted in block 314. Although a secure connection is desirable, it should be understood that the present disclosure is not limited as such, and that the computing device 140 may communicate with the computing device 150 over any type of communication connection. Thus, in some embodiments, the operations associated with the block 312 may be optional or omitted.

At block 314 of FIGS. 3A and 3B, in some embodiments, the wake engine 142 streams video 248 from a resource-constrained device (computing device 240) to a second device (e.g., computing device 150). Namely, in some examples, now that context 255 has been identified by the object detection model 244, the video 248 containing an image of the corresponding context 255 is streamed to the vision transformer model 254 for further and more detailed processing via computer vision techniques. For example, upon identifying a human figure, using a lightweight object detection model 244, on a doorbell camera, the wake engine 142 on the doorbell camera may trigger a live stream of video 248 from the doorbell camera containing the human figure so that the vision transformer model 254 can perform computer vision techniques to analyze what kind of human figure has arrived on the front porch. As previously discussed, the video 248 (and or image 246) streamed at block 314 may be streamed over the secure connection established at block 312.

At block 316 of FIG. 3A and FIG. 3B, the vision transformer model 254 processes video 248 streamed at block 314 to conduct computer vision analysis and tasks on the received video 248. For example, the vision transformer model 254 may complete computationally intensive tasks such as detailed object recognition, tracking, or scene understanding to video 248. Notably, in some embodiments, the wake engine 142 "wakes" the computing device 150 to process the video at block 316 when the wake engine 142 has affirmatively determined that an image contains the context 255. If an object of interest is not detected, the wake engine 142 may refrain from waking the computing device 150 or streaming the video. For example, the vision transformer model 254 may further analyze the video 248 feed received from the doorbell camera on the front porch in which a human figure steps onto the front porch. Any combination of computer vision techniques and observations may illustratively be used by a vision transformer model 254 to analyze the live video 248 from the doorbell camera to affirmatively identify the human figure as a package courier (e.g., confirming that event 270 is indeed a package courier arriving at the front porch with the package).

At block 318 of FIG. 3A and FIG. 3B, the computing device 150 may determine that the result generated by the vision transformer model 254 at block 316 satisfies the original user request 251. If a determination is made that context 255 was indeed identified and the other requirements relevant to the given user request 251 are satisfied, the routine proceeds to block 320. However, if the user request 251 is not satisfied, the routine may in some embodiments return to block 310 to continue scanning for another context 255.

At block 320 of FIG. 3A and FIG. 3B, an action is performed (e.g., by an application 280 on a cloud provider network 120 or local devices 282) in response to determining at block 318 that a user request is satisfied. For example, the action may include transmitting the determination of block 316 of the vision transformer model 254 to the resource-constrained device (e.g., computing device 140), an application 280 on the cloud provider network, or local devices 282. For example, upon receiving the identification of the package courier from the vision transformer model 254, the computing device 150 (e.g., through further use of an action plan orchestrated by LLM 252) may communicate with local devices 282 or applications 280 of cloud provider network 130 through the use of API interface 290, providing applications 280 with the notification that the package courier delivered a package on the front porch. In some examples, local devices 282 and/or applications 280 may respond to the results announced at block 318 by executing an event and/or action (e.g., any action associated with an event once it has been classified as such). In some embodiments, an event or action may be a change of device state (e.g., any switch between the following states: a device powered off, a device powered on, a device in low power mode). In another example, an event action may involve sounding an announcement a smart home speaker in response to the package delivery on the front porch being identified by the vision transformer model 254. In some embodiments, examples of event actions may include alerting a user, changing the state of an external device, recording an image or video, outputting an utterance, outputting a sound, or performing any other action that can be performed by one or more IoT devices within the network.

In some embodiments, upon receiving the identification of the package courier from the vision transformer model 254, the computing device 150 (e.g., through further use of an action plan orchestrated by LLM 252) may communicate with applications on the local network of computing device 150, providing such applications with the notification that the package courier delivered a package on the front porch. In some embodiments, upon receiving the identification of the package courier from the vision transformer model 254, the computing device 150 may transmit the identification of the package courier back to the computing device 140 with or without transmitting the identification to an application.

Example Hardware for Computing Device Including Computer Vision Architecture

Figure 4:
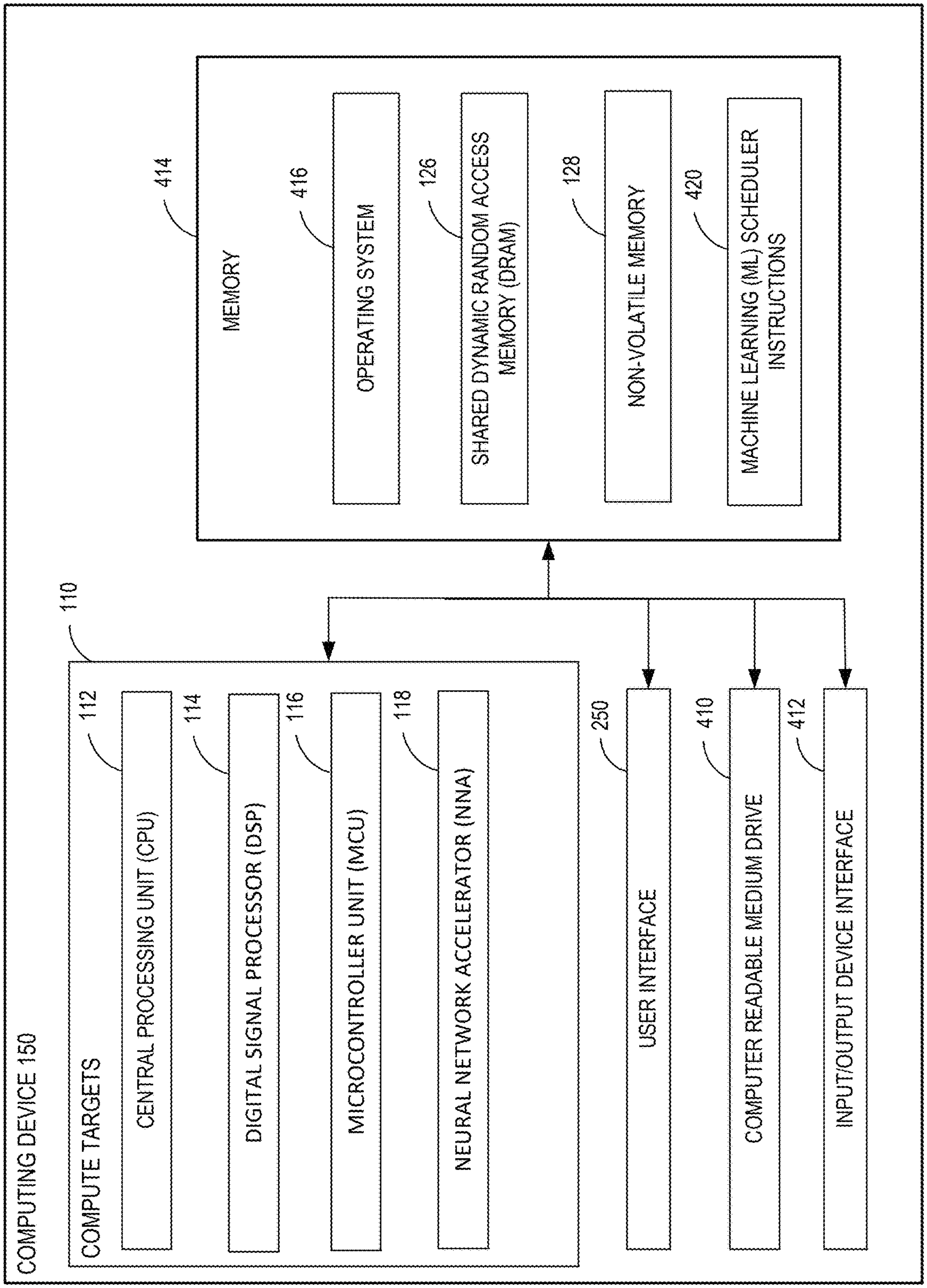
FIG. 4 illustrates a general architecture for a computing device executing computer vision architecture including an arrangement of computer hardware and software that may be used to implement aspects of the present disclosure.

FIG. 4 illustrates a general architecture for a computing device 150 executing certain embodiments of the computer vision architecture including an arrangement of computer hardware and software that may be used to implement aspects of the present disclosure. The hardware may be implemented on physical electronic devices, as described in greater detail below. The computing device 150 may include more (or fewer) elements than those shown in FIG. 4. It is not necessary, however, that all of these generally conventional elements be shown in order to prescribe enabling disclosure. Additionally, the general architecture stated in FIG. 4 may be used to implement one or more other components illustrated in FIG. 1.

As illustrated, computing device 150 includes compute targets 110, CPU 112, a DSP 114, an MCU 116, an NNA 118, a user interface 250, a computer-readable medium drive 410, an input/output device interface 412, and a memory 414, all of which may communicate with one another by way of a communication bus.

The user interface 250 may provide connectivity to one or more networks or computing systems, such as computing devices 140 and 150. The computing device 150 may thus receive information and instructions from other computing systems or services. The computing device 150 may, as one example, use information received from computing device 140 to determine whether to transfer execution of a task to a compute target included in computing device 140.

The compute targets 110 may also communicate to and from memory 414, such as to provide execution status, retrieve executable objects (e.g., to continue execution of a task), and the like, or some combination thereof. CPUs, such as CPU 112, may be general-purpose processors which are a primary component of most computing devices (e.g., computing device 150, computing devices 140 and 150, etc.). CPUs are capable of handling execution of ML models, such as neural networks. However, they may be lower efficiency as compared to other processing devices for execution of large-scale ML models. DSPs, such as DSP 114 may be microprocessors capable of performing high-speed calculations, such as for signal processing. DSPs 114 may, in some examples, perform such computations during execution of ML models. An MCU 116 may be a small, single chip that functions as an embedded microcontroller. Accelerators, such as NNA 118, may be processing devices specialized to perform a task, such as tasks requiring ML models. An NNA 118 may, in some examples, utilize a combination of processing devices to improve efficiency with respect to performing at task. An NNA 118 may, in some examples, include other processing devices, such as GPUs, Field Programmable Gate Arrays (FPGAs), application specific integrated circuits (ASICs), or the like. Accelerators, such as NNA 118, may accordingly be higher efficiency in performing these tasks with respect to other processing devices, such as other processing devices included in compute targets 110. The higher efficiency may be impacted by execution of a compiled model for a different type of processor, such as a processor internal to the accelerator. The compute targets 110 may further provide output information for an optional display (not shown) via the user interface 250. The user interface 250 may also accept input from an optional input device (not shown).

The computer-readable medium drive 410 may be used in storing data and code. Illustratively, the computer-readable medium drive 410 may be a hard drive that stores data and code. In some examples, the computer-readable medium drive 410 may be an external hard drive communicatively coupled to the computing device 150 (e.g., through a cable). Alternatively, the computer-readable medium drive 410 may be internal to the computing device 150. In some examples, the computer-readable medium drive 410 may be used to carry out any of the functions described below with respect to memory 414.

The memory 414 may store an operating system 416 that provides computer program instructions for use by one or more of compute targets 110 in the general administration and operation of the computing device 150, such as CPU 112. Memory 414 may further include a DRAM 126 and ML scheduler instructions 420 for ML scheduler 122 of FIG. 1.

Shared DRAM 126, may serve as a shared memory to facilitate sharing of sensor data chunks, as described herein. Shared DRAM 126 may include one or more structs or data objects storing information including, but not limited to, real time activation tensors information (e.g., memory addresses, bytes, shapes, data types), information about task execution status (e.g., compiled model portions, remaining compiled model portions for execution, etc.), metadata (e.g., previous compute target, current compute target, compute target which generated activation tensors, ML model corresponding to task, etc.). Shared DRAM 126 may be shared in a manner accessible to any compute targets 110. Shared DRAM 126 may, for example, include memory addresses corresponding to activation tensors for a compute target 110, sizes of activation tensors for a compute target 110, and the like, or some combination thereof.

ML scheduler instructions 420 may illustratively be instructions for implementing ML scheduler 122, such as instructions relating to selection of compute targets for execution of tasks, determination of model priority with respect to compilation of ML model portions, or the like. ML scheduler instructions may illustratively include threshold completion times for task execution using the ML models. ML scheduler instructions may also include a priority policy, as described herein. The priority policy may, for example, indicate when execution of tasks can be transferred between compute targets 110. A rule included in a priority policy may be, as one example, if NNA 118 is loaded greater than 20% then use DSP 114 if available. The ML scheduler instructions 420 may further include data reflecting processing characteristics of compute targets 110.

The computing device 150 of FIG. 4 is one illustrative configuration of such a device, of which others are possible. For example, computing device 150 may, in some examples, also include data to execute compiler 124, as described herein. As another example, while shown as a single device, the computing device 150 may, in some examples, be implemented as multiple physical devices.

Terminology and Other Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in some embodiments, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In some alternative embodiments, the storage medium can be integral to the processor device. The processor device and the storage medium can reside in an ASIC. The ASIC can reside in a user terminal. In some embodiments, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:

a first device comprising a first processor configured to implement an object detection model; and a second device comprising a second processor configured to implement a large language model (LLM) and a vision transformer model, the second processor to at least:

receive a user request to perform an action in response to an event, wherein the user request specifies an object;

provide the user request to the LLM to generate configuration data for the object detection model, wherein the configuration data comprises an identification of the object; and provide the configuration data to the first device;

the first device using the first processor to at least:

receive the configuration data from the second device;

configure the object detection model based on the configuration data, wherein configuring the object detection model based on the configuration data causes the object detection model to determine whether the object exists within an image;

receive a first image from an image capture device;

detect an existence of the object in the first image by processing the first image using the object detection model;

in response to detecting the existence of the object in the first image, provide a first video obtained by the image capture device to the second device, wherein the first video includes the first image; and the second device further using the second processor to at least:

receive the first video from the first device;

apply the first video to the vision transformer model to determine an occurrence of the event; and in response to determining the occurrence of the event, trigger execution of the action.

2. The system of claim 1, wherein the object detection model uses less computing resources than the vision transformer model.

3. The system of claim 1, wherein the object detection model is at least one of:

a lightweight convolutional neural network (CNN);

a model based on a MobileNet architecture; or a model based on an EfficientDet architecture.

4. The system of claim 1, wherein the event is at least one of:

a motion;

a sound;

a change of state;

an action captured in the first image; or an action captured in the first video.

5. The system of claim 1, wherein the first processor is further to, in response to detecting the existence of the object in the first image, establish a secure connection with the second device to stream the first video to the second device, wherein the secure connection comprises:

an encrypted tunnel; or a virtual private network (VPN).

6. The system of claim 1, wherein the LLM is trained to identify the object based on a target domain of the object.

7. The system of claim 1, wherein the first processor is further to:

in response to detecting an absence of the object in a second image received from the image capture device, omit transmission of a second video obtained by the image capture device to the second device, wherein the second video includes the second image.

8. The system of claim 1, wherein the vision transformer model determines the occurrence of the event using a computer vision task, wherein the computer vision task is at least one of:

applying object recognition to the first video;

applying object tracking to the first video; or applying scene understanding to the first video.

9. A computer-implemented method comprising:

receiving, at a first device, a request to perform an action in response to an event, wherein the request specifies a context, and wherein the first device implements a large language model (LLM) and a vision transformer model;

providing the request to the LLM to generate configuration data for an object detection model of a second device, wherein the configuration data comprises an identification of the context;

receiving, at the second device, the configuration data from the first device;

configuring the object detection model of the second device based on the configuration data;

capturing a first image with the second device;

detecting an existence of the context in the first image by processing the first image using the object detection model;

in response to detecting the existence of the context in the first image, providing a first video obtained by the second device to the first device, wherein the first video includes the first image;

applying, using the first device, the first video to the vision transformer model to determine an occurrence of the event; and in response to determining the occurrence of the event, triggering execution of the action.

10. The computer-implemented method of claim 9, wherein the LLM uses an LLM agent to:

generate context data to inform generation of the configuration data; and generate an action plan, wherein the action plan is at least one of:

an ordered list of steps for the object detection model to execute; or an ordered list of steps for the vision transformer model to execute.

11. The computer-implemented method of claim 10, wherein the object detection model comprises a specialized machine learning model trained to:

identify a plurality of objects of a target domain;

optimize performance of the object detection model on a resource-constrained device; and generate the action plan.

12. The computer-implemented method of claim 9, wherein the event is at least one of:

a motion;

a sound;

a change of state;

an action captured in the first image; or an action captured in the first video.

13. The computer-implemented method of claim 9, wherein the first device uses more computing resources during execution than the second device.

14. The computer-implemented method of claim 9, wherein the action is at least one of:

alerting a user, changing a state of a device, recording an image, outputting an utterance, or outputting a sound.

15. A system comprising:

a first device comprising a first processor configured to implement a first machine learning model;

a second device comprising a second processor configured to implement a large language model (LLM) and a second machine learning model, the second processor to at least:

receive a request to perform an action in response to an event, wherein the request specifies a context;

provide the request to the LLM to generate configuration data for the first machine learning model, wherein the configuration data comprises an identification of the context; and provide the configuration data to the first device;

the first device using the first processor to at least:

receive the configuration data from the second device;

configure the first machine learning model based on the configuration data;

capture a first image;

detect an existence of the context in the first image by processing the first image using the first machine learning model;

in response to detecting the existence of the context in the first image, provide a first video to the second device; and the second device further using the second processor to at least:

receive the first video from the first device;

apply the first video to the second machine learning model to determine an occurrence of the event; and in response to determining the occurrence of the event, trigger execution of the action.

16. The system of claim 15, wherein the first machine learning model is a specialized object detection model optimized for a resource-constrained device, and wherein the second machine learning model is a vision transformer model.

17. The system of claim 15, wherein the second device is a server, and wherein the action is executed by an application hosted by the server.

18. The system of claim 15, wherein the first device establishes a secure connection with the second device to provide an encrypted version of the first video to the second device.

19. The system of claim 15, wherein the first device is a resource constrained device, and wherein the second machine learning model is more resource intensive than the first machine learning model.

20. The system of claim 15, wherein the first device continuously executes the first machine learning model to monitor a plurality of images captured by an image capture device.

* * * * *